United States Patent

Cruz et al.

Patent Number: 5,858,082
Date of Patent: Jan. 12, 1999

[54] SELF-INTERLOCKING REINFORCEMENT FIBERS

[76] Inventors: Héctor Gonzalo Cruz, Calle Bonet #354 Miradero, Mayagüez, Puerto Rico, 00680; Philip G. Malone, 107 Fox Run La.; Toy Spotswood Poole, 110 Evelyn St., both of Vicksburg, Miss. 39180

[21] Appl. No.: 929,910

[22] Filed: Sep. 15, 1997

[51] Int. Cl.$^6$ .................................................. C04B 30/02
[52] U.S. Cl. .......................... 106/644; 428/370; 428/902; 264/333; 264/DIG. 26; 264/DIG. 43; 264/DIG. 66; 264/DIG. 75
[58] Field of Search ............................ 106/644; 428/902, 428/903, 370; 264/333, DIG. 26, DIG. 28, DIG. 43, DIG. 65, DIG. 66, DIG. 75

[56] References Cited

U.S. PATENT DOCUMENTS

| | | | |
|---|---|---|---|
| 5,162,059 | 11/1992 | Rossi | 106/644 |
| 5,451,471 | 9/1995 | Over et al. | 106/644 |
| 5,614,305 | 3/1997 | Paine et al. | 428/301.1 |
| 5,660,624 | 8/1997 | Dry | 106/677 |

FOREIGN PATENT DOCUMENTS

| | | |
|---|---|---|
| 501879 | 9/1992 | European Pat. Off. . |
| 59-190251 | 10/1984 | Japan . |
| 360059036 | 4/1985 | Japan . |
| 03126649 | 5/1991 | Japan . |
| 04317446 | 11/1992 | Japan . |
| 406278235 | 10/1994 | Japan . |
| 407137149 | 5/1995 | Japan . |
| 409126911 | 5/1997 | Japan . |
| 09176330 | 7/1997 | Japan . |
| 10017959 | 1/1998 | Japan . |

OTHER PUBLICATIONS

"Active Control of Crack–tip Stress Intensity by Contraction of Shape Memory TiNi Fibers Embedded in Epoxy Matrix Composite: Dependency of Stress Intensity Factor on Crack–tip Domain Size" Shimamoto et al. Int. Conf. Compos. Mater. Proc., 11th (1997) vol. 6, pp. 493–499.

*Primary Examiner*—Paul Marcantoni
*Attorney, Agent, or Firm*—Luther A. Marsh

[57] ABSTRACT

The invention's first embodiment uses shape memory alloy (SMA) fibers that are blended into a concrete composite material as straight fibers and are made to deform themselves and anchor and interlock themselves after dispersement in the composite material resulting in a more evenly distributed and interlocked fiber reinforcement of the cementitious material. A self-shaping fiber can be imparted to the concrete material by making the fibers out of SMA such as nickel-titanium alloy known as nitinol where the cementitious composite material mixture is briefly heated above the "transition" temperature prior to hardening that causes the fibers to change shape. Nitinol fibers are used alone in place of conventional steel fibers. A second embodiment uses conventional coiled metal steel fiber combined with a SMA clip for retaining the coiled metal fiber during the blending of this clipped fiber into a cementitious material with required heating yielding a shape change of the coiled metal fibers ultimately resulting in improved reinforcement characteristics.

5 Claims, 1 Drawing Sheet

SELF-INTERLOCKING REINFORCEMENT FIBERS

STATEMENT OF GOVERNMENT INTEREST

The invention described herein may be manufactured and used by or for the United States Government for governmental purposes without the payment of any royalties thereon.

FIELD OF THE INVENTION

The invention pertains to a fiber-reinforced composite matrix. In particular, the fibers are metallic fibers that use shape memory alloy materials that deform themselves to make an interlocked composite matrix during the processing thereof.

BACKGROUND OF THE INVENTION

Non-straight reinforcement fibers in a mortar or concrete based matrix, i.e. bent or deformed fibers, perform satisfactorily because they are not readily pulled out of the hardened matrix. If the fibers interlock with one another and have a curved or bent shape, they are even less prone to be pulled out as the strain in the concrete increases. U.S. Pat. No. 5,443,918 by Banthia et al. entitled "Metal Fiber with Optimized Geometry for Reinforcing Cement-Based Materials" teaches of a metal fiber for reinforcing cement-based materials which comprises an elongated, substantially straight central portion with sinusoid shaped end portions that have a particular engineered designed shape. Other examples of such fibers are taught in U.S. Pat. No. 5,451,471 by Over et al. entitled "Reinforcement Fiber for Reinforcing Concrete" and U.S. Pat. No. 5,162,059 by Rossi entitled "Discontinuous Fiber Made of Drawn Steel Wire, and a Fiber Composite Containing said Fiber." One of the problems involved with the addition of fibers to a concrete composite material includes the difficulty of mixing fiber, especially shaped metal fibers into cementitious material. Fibers that are designed to interlock will tend to tangle or lock together during mixing and form clusters of fibers which are referred to as fiber "balls" such that the fibers never become evenly dispersed throughout the concrete composite material. This phenomenon results in non-uniform fiber composite matrix spaces with no reinforcement fibers yielding a composite lacking in mechanical strength.

This problem is solved by the invention's use of shape memory alloy (SMA) materials that allows the fibers to form complex shapes to assure that it cannot be readily removed from a hardened concrete composite material.

SUMMARY OF THE INVENTION

The invention's first embodiment uses SMA fibers that are blended into a concrete composite material as straight fibers and are made to deform themselves and anchor and interlock themselves after dispersement in the composite material resulting in a more evenly distributed and interlocked fiber reinforcement of the cemetitious material. A self-shaping fiber can be imparted to the concrete material by making the fibers out of SMA material such as nickel-titanium alloy known as nitinol where the cementitious composite material mixture is briefly heated above the "transition" temperature prior to hardening that causes the fibers to change shape. Nitinol fibers are used alone in place of conventional steel fibers. A second embodiment uses conventional coiled metal steel fiber combined with an SMA clip for retaining the coiled metal fiber during the blending of this clipped fiber into a cementitious material with required heating yielding a shape change of the coiled metal fibers ultimately resulting in improved reinforcement characteristics.

The nitinol fibers, as a preferred material, are "trained" by heating bent fibers to approximately 500° C. for approximately one hour. The trained SMA fibers are cooled below their training temperature and straightened at this temperature and then added to the cementitious material using similar methods as used with conventional metal reinforcing fibers. After the fibers are distributed in the cementitious material, this material is heated above a "transition" temperature of the SMA material, typically 30° to 40° C. for nitinol causing the fibers to return to their deformed shape. The cementitious material is then vibrated to consolidate the matrix around the bent and interlocked fibers using either embodiment. The cementitious material is then allowed to moist cure preferably in a cool environment.

DETAILED DESCRIPTION OF THE INVENTION

SMA are alloys which, if plastically deformed at one temperature, will recover their original shape on being raised to a particular higher temperature, called the transition temperature. The original shape, which is remembered by the alloy alloy upon being heated above the transition temperature is imprinted in the alloy by forming the alloy that shape at a temperature far above the transition temperature.

Metal alloys displaying same shape memory effect includes nickel-titanium (nitinol), copper-nickel-aluminum and copper-zinc-aluminum (SMA brass). These alloys have one particular crystal structure called martensite at a temperature below the transition temperature for the particular SMA material, and a different crystal structure, called austenite, above the transition temperature.

To "train" the SMA fiber to remember a particular shape configuration, it is first heated to a high temperature sufficient to anneal the fiber, typically 500° to 800° C. While held at this temperature, the part is mechanically stressed by external clamping or similar means to produce a desired shape. During this operation, the metal assumes what is called the parent or beta phase. The fiber is subsequently cooled to a temperature at which the internal structure of the metal is transformed into an orderly crystal state referred to as a quench induced martensitic state. The martensitic transformation starts at a temperature referred to as $M_S$, and finishes at a lower temperature referred to as $M_F$. These temperatures vary as a function of alloy composition. $M_S$ is reported to vary between −273° C. to 100° C. for nitinol binary alloys and −105° to 300° C. for Cu-Zn-Al and Cu-Ni-Al ternaries. After a fiber has been trained, the fiber can be mechanically stressed inelastically to a deformed state having substantial residual strain. If the fiber is now heated to a temperature referred to as $A_S$, the internal crystal structure begins to change from martensitic to austenitic, a process which is complete at a higher temperature referred to as $A_F$. During this process, the fiber recovers its original "trained" shape, and may exert a substantial force in doing so. $A_S$ is above $M_S$ and the range between $A_S$ and $A_F$ is typically 20° to 30° C. The temperature range between $A_S$ and $A_F$ may be defined as a memory recovery range. Typically, this range is about 20° C. although it has been as low as 6° C. and as high as 80° C. for certain alloys.

Figure 1:
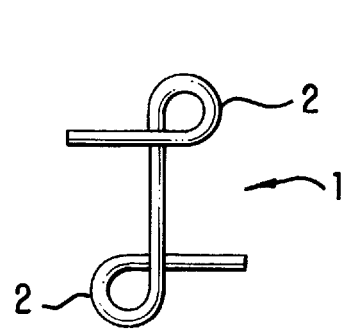
FIG. 1 shows a side view of the SMA fiber in a deformed state after heating to 500° C.
Figure 2:
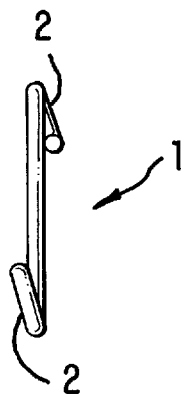
FIG. 2 shows a side view of FIG. 1.

FIG. 1 shows a single SMA fiber 1 alone in a cementitious medium such as portland cement paste, mortar or grout; which in multiples thereof are blended into a fresh concrete mixture as straight fibers that are made to deform themselves and interlock after dispersing to produce a more evenly distributed interlocking metal fiber reinforcement. A self-shaping fiber can be imparted to the concrete material by making the fibers out of SMA material such as nickel-titanium alloy known as nitinol where the cementitious composite material mixture is briefly heated above the transition temperature prior to hardening of the matrix, such heating causes the fibers to change shape. The nitinol fibers 1, as a preferred material, are "trained" by heating bent fibers to approximately 500° C. for approximately one hour as required by the type of SMA alloy used. The trained SMA fibers are then bent into straight shapes and then added to a concrete mixture in a manner similar to methods employed when using conventional metal reinforcing fibers. After the fibers are distributed in the cementitious composite material, the material is heated above the transition temperature of the SMA material, typically between 30° and 40° C., and the fibers returned to their trained bent shape. The mixture is then vibrated to consolidate the matrix around the bent and interlocked fibers 1 and where the cementitious mixture is allowed to moist cure in a cool environment at approximately 23°–25° C. or alternatively may be heat or steam-cured in a manner well known in the precast concrete industry. The fibers 1 are introduced into the fluid cementitious medium as a straight or near-straight fiber. The fluid mixture of the fibers and the cementitious medium with the fibers 1 distributed through the medium is heated to a temperature above the transition temperature of the SMA material used. The fibers 1 revert to a curved shape to which they have been previously trained. In the process of assuming a curved shape, the fibers 1 interlock one to another and the shape further anchors the fibers 1 into the cementitious medium. The mixture is vibrated briefly to consolidate the cementitious medium around the curved fibers. While a variety of curved shapes will facilitate the interlocking or interlacing of the fibers 1, a fiber trained to a shape that includes a straight central portion with a loop 2 at each end as shown in FIG. 1 and FIG. 2 would be a preferred shape. Typical spatial sizes of the fiber 1 in a bent shape is approximately one cubic inch.

A step-by-step procedure is as follows:

1. Form the "as drawn from the die" SMA wire, that is furnished by a SMA manufacturer, into loops on a metal plate and clamp the wire in place as that it remains in the "L" or double loop shape.
2. Heat the plate and the attached wire to 500° C. for one hour as recommended by the SMA manufacturer.
3. Remove the plate and attached wire from the furnace and allow the alloy to cool while still attached to the plate. Air or water quenching produce the same result.
4. Detach the wire from the plate. At this point the wire retains its "L" shape. If longer lengths of wire are used to assist in clamping, the wire can be trimmed to the appropriate length.
5. Straighten each loop out to form a straight wire. At this point each fiber is a straight or near-straight piece of wire.
6. Blend the wires into a fluid cementitious matrix such as a sand-water-portland cement grout or mortar mixture.
7. Heat the mixture containing the fibers above the transition temperature for the SMA wire. At this point the fibers revert to their L-shaped form.
8. Vibrate the mixture of fibers and cement-based grout mixture to consolidate the mass. This allows the mixture to flow around the fibers and closes any openings or cavities in the grout mass that might have been produced by the movement of the fibers.
9. Cure the cementitious matrix containing the deformed or L-shaped fibers. Typically curing would involve placing the mass of grout and fiber in a cool (23° C.) moist environment such as a fog room or fog cabinet. Alternatively, the cementitious mass could be cured in an accelerated fashion using moist heat or steam, a procedure that is well-known in the precast concrete industry.

Figure 3:
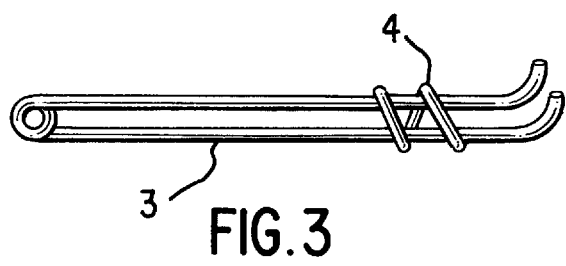
FIG. 3 shows a second embodiment of the invention using a compound fiber using a SMA clip to restrain a spring-like conventional metal fiber below the transition temperature.
Figure 4:
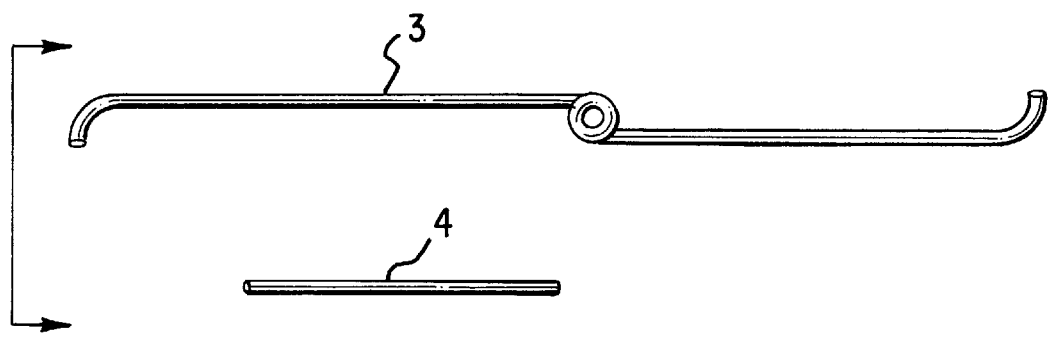
FIG. 4 shows FIG. 3 when the fiber-clip is in a cementitious mixture upon being heated above the transition temperature.

FIG. 3 shows a second embodiment of the invention using a compound fiber using a SMA clip 4 to restrain a spring-like conventional metal fiber 3 in a folded condition below a SMA transition temperature. This second embodiment uses deformed coiled conventional metal fiber 3 with a SMA clip 4 for retaining the coiled conventional metal fiber 3 to allow shape change of the conventional metal fiber 3 after subjecting the combined unit in FIG. 3 to above a transition temperature resulting in improved reinforcement of a cemetitious matrix material. When heated, the clip 4 changes shape and releases the restrained metal fiber 3 and it unfolds into a longer and more complex shape as shown in FIG. 4 yielding fibers that interlock with one another. The method of blending the fibers of this second embodiment is similar to that used by the first embodiment above.

The self-interlocking fibers 1 taught in this invention are particularly useful in concretes or grouts that will be pumped into areas having an elevated temperature so that the fibers are subjected to a high temperature when the grout is fluid. Such applications would include oil-well cementing, grouting in geothermal areas, and sealing deep waste repositories. Additionally this type of reinforcement can be used in concrete or grouts that have organic as well as inorganic binders. The inter-locking fibers 1 can also be used in thermally setting materials such as sulfur cements. In this later case, the fibers would be mixed with a granular thermally fusible solid such as powdered sulfur and as the sulfur is melted, the fibers would transform to the curved form. The interlocked fibers would be trapped in the molten sulfur as it cooled and hardened. A similar approach can be used with a lower temperature based SMA material.

While this invention has been described in terms of a specific preferred embodiment, it is understood that it is capable of further modification and adaptation of the invention following in general the principle of the invention and including such departures from the present disclosure as come within the known or customary practice in the arts to which the invention pertains and may be applied to the central features set forth, and fall within the scope of the invention and of the limits of the appended claims.

We claim:

1. A method of making a composite matrix material with reinforcement fibers made of a shape memory alloy material wherein the fibers are blended and dispersed within a fluid composite matrix material prior to hardening comprising the sequential steps of:

a) forming as drawn from a shape memory alloy (SMA) fibers into loops on a plate and clamping the fibers in place such that each fiber remains in a twisted shape;

b) heating the plate with the attached fiber to be trained to an annealing temperature in a heat source;

c) removing the plate with attached fibers from the heat source and allowing the fibers to cool while still attached to the plate;

d) detaching the fibers from the plate while each of the fibers are in twisted shapes;

e) straightening the loops out of the fibers to form straight fibers;

f) blending the fibers into a fluid composite matrix material mixture;

g) heating the mixture above the transition temperature for the SMA fibers whereby the fibers revert to the twisted shape;

h) vibrating the mixture to consolidate the mixture thereby allowing the mixture to flow around each fiber and closes any cavities in the mixture that occurs by movement of the fibers; and i) curing the mixture containing the twisted shape fibers.

2. The method of claim 1 wherein the fluid composite matrix material is a sand-water-portland cement grout or mortar mixture.

3. The method of claim 1 wherein the fluid composite matrix material is a mortar mixture.

4. The method of claim 1 wherein the fluid composite matrix material is a thermally setting sulfur cement.

5. The method of claim 1 wherein the SMA material is selected from the group consisting of nitinol, copper-nickel-aluminum and copper-zinc-aluminum.

* * * * *